US006347243B1

(12) United States Patent
Fraden

(10) Patent No.: US 6,347,243 B1
(45) Date of Patent: Feb. 12, 2002

(54) PROBE COVER FOR INFRARED THERMOMETER

(75) Inventor: Jacob Fraden, La Jolla, CA (US)

(73) Assignee: Advanced Monitors Corp., San Diego, CA (US)

( * ) Notice: Subject to any disclaimer, the term of this patent is extended or adjusted under 35 U.S.C. 154(b) by 0 days.

(21) Appl. No.: 09/035,393

(22) Filed: Mar. 5, 1998

(51) Int. Cl.[7] ................................................. A61B 6/00
(52) U.S. Cl. ....................... 600/474; 374/158; 374/209; 600/549
(58) Field of Search ................................. 600/474, 200, 600/203, 186, 549; 374/158, 209, 121

(56) References Cited

U.S. PATENT DOCUMENTS

| 4,311,707 A | * | 1/1982 | Birnbaum et al. | 424/305 |
| 4,911,559 A | | 3/1990 | Meyst et al. | 374/158 |
| 5,066,142 A | | 11/1991 | DeFrank et al. | 374/208 |
| 5,163,418 A | * | 11/1992 | Fraden et al. | 128/9 |
| 5,179,936 A | * | 1/1993 | O'Hara et al. | 128/9 |
| 5,293,862 A | * | 3/1994 | O'Hara et al. | 128/9 |
| RE34,599 E | * | 5/1994 | Suszynski et al. | 374/158 |
| 5,609,564 A | * | 3/1997 | Makita et al. | 600/200 |
| 5,833,367 A | * | 3/1997 | Cheslock et al. | 374/158 |
| 5,795,067 A | * | 8/1998 | Fraden et al. | 374/158 |
| 5,935,058 A | * | 8/1999 | Makita et al. | 600/200 |
| 6,186,959 B1 | * | 2/2001 | Canfield et al. | 600/559 |

FOREIGN PATENT DOCUMENTS

WO  WO 97/42475  11/1997  ............ G01K/1/08

* cited by examiner

Primary Examiner—Marvin M. Lateef
Assistant Examiner—Eleni Mantis Mercader
(74) Attorney, Agent, or Firm—The Maxham Firm

(57) ABSTRACT

A probe cover for infrared (IR) thermometers having two distinct portions, one which is stable, and the other that may change. The optical portion of the cover is precisely pre-shaped. This portion engages with the end of the IR probe and remains unchanged during the installation and temperature measurement. The remainder of the cover may freely change its shape and conform to the probe body configuration for easy installation.

51 Claims, 3 Drawing Sheets

PROBE COVER FOR INFRARED THERMOMETER

BACKGROUND OF THE INVENTION

1. Field of the Invention

The present invention relates generally to infrared thermometers. More specifically, it relates to the probe cover portion of an infrared thermometer, commonly known as tympanic or ear thermometer.

2. Description of Prior Art

Temperature of an object, specifically, of a human or animal, can be measured by the means of thermal conduction or, alternatively, by means of thermal radiation. In the latter case, naturally emanated electromagnetic radiation in the far infrared spectral range is detected by an appropriate sensor, whose output signal is indicative of the surface temperature of an object. A combination of a sensor, electronic circuit and other components form an infrared (IR) thermometer, which is an opto-electronic instrument.

Human or animal body temperature can be measured by placing an optical probe of an IR thermometer into the ear canal, because the tympanic membrane temperature is a recognized indicator of the core body temperature.

Nearly all medical contact thermometers, for example, oral or rectal, use sanitary probe covers. In a contact probe cover, thermal energy (heat) is transmitted by means of thermal conduction, thus, requirements to a probe cover shall comply with the thermally conductive properties of the probe cover material. Various conventional covers for such contact thermometers are described in many patents, for example, in U.S. Pat. No. 4,159,766 issued to Kluge.

For measuring surface temperature of an object without a physical contact, the IR probe is aimed at the area of interest. In medical applications, to measure temperature of a tympanic membrane and the surrounding tissues, the probe is placed into the ear canal. Before the insertion, a probe cover is installed onto the probe to envelop its parts that otherwise might come in contact with the object tissues. Such a cover shall not only provide a sanitary protection against contamination of the probe by ear wax and other soiling biological compounds, but also it shall possess other properties which are critical for accurate temperature measurement by means of detecting infrared signal. Such properties include a good transparency of the front portion of the probe cover in the spectral range of interest, low directional distortion of optical rays, tight manufacturing tolerances, stability of the optical properties during installation onto the probe, long term stability, etc. Probe covers for IR thermometers are exemplified U.S. Pat. No. 5,088,834 issued to Howe and Brown and U.S. Pat. No. 5,163,418 issued to Fraden et al. A probe cover for an IR thermometer differs significantly from a probe cover used with a conventional contact thermometer.

As a rule, any prior art probe cover intended for an IR thermometer employed a thin polymer membrane at its optical end (thickness ranging from as little as 0.0005 to as much as 0.005"). The IR radiation has to pass through that membrane before entering the probe and being detected by the IR sensor. In effect, such a probe cover works as an optical filter. Typical materials for fabricating the probe covers are polyethylene, polypropylene, and copolymers of the above.

When the probe cover is installed onto the IR thermometer probe and subsequently inserted into a body cavity (such as an ear canal), it is important to assure that optical properties of the membrane either remain unchanged, or change in a known and predictable fashion. Otherwise, the optical transmission of the cover may be altered which would result in an unacceptable magnitude of error in temperature measurement.

U.S. Pat. Nos. 4,662,360, 5,293,862 and 5,179,936 issued to O'Hara et al describe a tubular body of the probe cover with a bonded membrane where the tubular body may be injection molded. The tubular body is made of a pliant plastic material having thickness on the order of 0.010". When installed on the IR thermometer probe, the membrane is stretched to smooth out the wrinkles. While removing the wrinkles may be beneficial, the stretching is undesirable as it cannot be well controlled due to manufacturing tolerances of the cover and the probe. This may result in variations in the front membrane transmission and, subsequently, in error.

The above indicated U.S. Pat. No. '936 also describes a binding ring which supports a membrane and the ring is a part of the rigid tubular body of the probe cover (referred to in the patent as "speculum"), yet the binding ring doesn't prevent the film from stretching.

To prevent reuse of a probe cover, Twentier in U.S. Pat. No. 3,878,836 teaches a probe cover ("speculum") having a stretchable portion near the tip which cracks during the installation, thus it cannot be reused.

Summarizing prior art, two types of probe covers for the IR thermometers are: covers which are pre-shaped during the manufacturing process and those whose shape changes during the installation onto the probe. Both types have their own advantages and disadvantages. The pre-shaped cover is more independent of the user operating techniques and does not require a precise matching of its shape with that of the probe. Examples of such covers are those produced by Thermoscan Inc., where the front window (membrane) of the cover does not interact with the probe during the installation. However, such a probe cover maintains the membrane shape quite unpredictably, due to flaccid and pliant optical end of the cover. To assure acceptable performance, the pre-shaped probe covers and the IR thermometer probes have to be produced with tight tolerances which significantly affects their costs.

The second type embraces the probe covers which do not have defined shapes before being placed onto the probe. These probe covers are not sensitive to manufacturer's tolerances and easily can adapt to the shape of the probe. For example, the probe covers described in U.S. Pat. No. 4,911,559 issued to Meist and Suszinski, have a flat film laminated with backing material. The film stretches around the probe during the installation, thus taking its shape. The other covers, as exemplified by previously mentioned U.S. Pat. Nos. '862, '936, '834, and '418, while having a pre-shaped body, still require stretch of the membrane by the probe during the installation. The type of the probe covers where the membrane stretches, suffers from significant variations in the IR transmission characteristics due to inconsistency in stretching of the membrane during the installation and even breakage of the membrane because of its small thickness and manufacturer's tolerances. The non-shaped probe covers occupy less space and generally are more convenient to carry with the IR thermometer. However, this advantage is negated by significantly reduced consistency in the IR transmission.

With respect to attaching the polymer membrane to the body of the probe cover, there are several methods known in the art—all of them require use of some kind of an engagement component to which the membrane is attached one way or another. One method is ultrasonic welding as in the above U.S. Pat. Nos. '862 and '418 where the membrane is attached to a supporting ring which is intended for engagement with the IR thermometer probe. Other methods include insert molding, thermal welding, clamping, or laminating with a backing material, as in the above U.S. Pat. No. '559. The entire probe cover may be fabricated as a unitary device by thermo-forming or injection molding, as described in the above U.S. Pat. No. '834.

Summarizing a deficiency of the prior art, it may be said that all known probe covers cause inconsistency in detecting infrared radiation due to either poorly controlled shape of the membrane or stretching of the membrane during the installation procedure.

Thus it is an object of the present invention to provide a sanitary barrier between the IR probe and surface of the ear canal.

It is another object of this invention to provide a probe cover which has an optical front that does not change during and after the installation.

Another object of the invention is a probe cover which is less sensitive to the manufacturer's tolerances.

It is a further object of this invention to provide a probe cover which occupies less space during storage.

It is another object of this invention to provide a probe cover which is less likely to break during the installation.

Still another object of this invention is to provide a probe cover which is easy to install onto the probe and whose optical and thermal properties do not change during the installation process.

SUMMARY OF THE INVENTION

The objects of this invention are attained by combining in a probe cover properties of the pre-shaped and non-pre-shaped probe covers. The new probe cover contains two distinct portions—that which is stable, and the other that may change. This is achieved by a precise pre-shaping only the optical portion of the cover. This part engages with the end of the IR probe and remains unchanged during the installation and temperature measurement, while allowing the rest of the cover to freely change its shape and conform to the probe body configuration for easy installation.

DETAILED DESCRIPTION OF PREFERRED EMBODIMENTS

A probe cover for an infrared thermometer is a sanitary envelope which forms a barrier between the instrument and the patient. In this description we exemplify probe covers for an infrared thermometer for taking temperature from an ear canal of a human or animal. The identical covers are applicable for taking measurements from any other body cavity or surface of a human or animal. The material for the probe cover's front end, that is, for its optical portion, is selected from the group of polymers which have significant transparency in the spectral range between 3 and 15 $\mu$m. Examples are polyethylene, polypropylene, and copolymers of such. As a rule, thickness of the optical portion of the cover is on the order of 20 micrometers. This assures a reasonable compromise between an acceptable IR transmission and mechanical strength.

Figure 1:
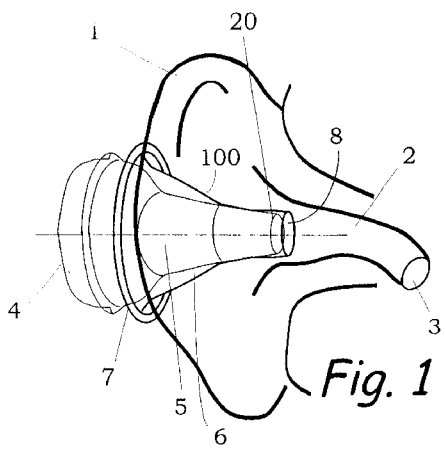
FIG. 1 shows a prior art probe cover attached to the probe of an infrared thermometer and inserted into a human ear canal.

FIG. 1 shows an infrared (IR) thermometer 4. Its probe 5 may house an infrared sensor, whose function is to detect thermal radiation from ear canal 2 of patient's ear 1. The end of ear canal 2 is terminated by tympanic membrane 3 whose temperature is close to that of the interior of a patient's body. Probe cover 100 is positioned over probe 5 in such a manner as to make nearly impossible any physical contact between probe 5 and any part of the patient body, specifically ear canal 2.

A probe cover consists of several portions to perform three distinct functions: retention, enveloping, and optical. These three portions may be: a proximal portion having an engagement rim 7 for connecting to IR thermometer 4 and retaining the cover on probe 5 during the measurement, an intermediate portion 6 to envelop the body of probe 5, and a distal optical portion forming membrane 8 which is the front end of the cover. The front end possesses the optical and thermal properties essential for accurate temperature measurement by allowing passage of infrared energy into window 20 of probe 5.

In the present invention, the probe cover is fabricated to perform all three functions. The retention and enveloping functions may be performed by using several methods, some of which are described below. In the following description, the retention portion is referred to as the rim, the enveloping portion is referred to as the skirt. The optical function is performed by a rigid front end ring which defines shape of the optical membrane. The shape of the membrane shall be preserved before, during and after the installation onto the probe. The optical and mechanical arrangement of the probe covers as described below, shall not be adversely affected by a method of manufacturing.

The Ring

Ring 11 (FIG. 2) supports thin membrane 8 which forms the front end window of the probe cover. The essential feature of this novel probe cover, which is the principal subject of this invention, is that the shape of membrane 8 remains essentially the same after the installation as it was before. This function is accomplished by rigid ring 11. To keep the membrane tight, it may be given a thermal treatment which will increase its tension. While the ring supports the membrane, it has two other functions. Firstly, it shall engage with the probe tip in such a manner as to position the membrane in the correct alignment with the probe's window. The ring needs to have a profile corresponding to the shape of the probe tip for the automatic coaxial alignment with the probe. Secondly, the ring shall prevent contact between the probe and the membrane, so the membrane will not be deformed by the probe after the installation.

Figure 2:
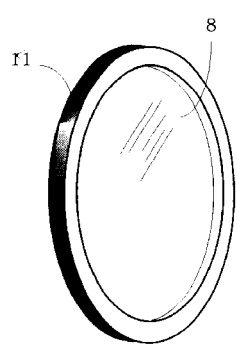
FIG. 2 depicts a front ring with a flat film.
Figure 3:
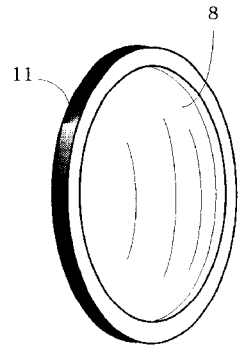
FIG. 3 is a front ring with a convex film.

The shape of the membrane is determined during the manufacturing process: it may be flat in the clearance of ring 11, as shown in FIG. 2, or it may have a convex profile (FIG. 3). If so desirable, membrane 8 may have multiple grooves, dents, or any other optical profile, or it may have variable thickness (not shown) which could be beneficial for shaping the field of view of the IR thermometer, aid in manufacturing process, to minimize contact with patient's skin, etc. The convex membrane may have advantages of better transmission of infrared radiation from a wide field of view if so desired for a particular application.

Figure 9:
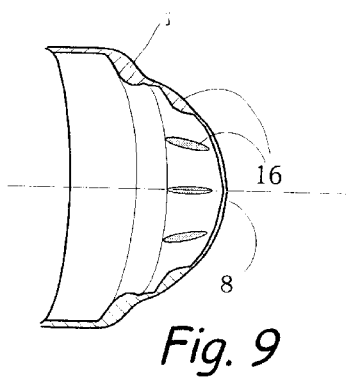
FIG. 9 shows a front portion of a probe cover with reinforcing humps.
Figure 10:
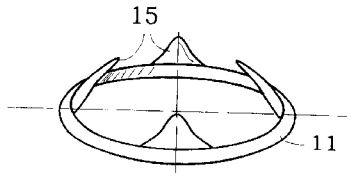
FIG. 10 is a ring with fingers.

To retain the convex profile of membrane 8, it may be reinforced with humps 16 as shown in FIG. 9, where ring 11 provides the overall support of the membrane. Naturally, humps 16 are practical when the probe cover is produced by either injection or pressure molding or thermo-forming processes. When the manufacturing process requires attachment of the separate plastic film to form membrane 8, the convex shape formation may be aided by protruding fingers 15 from ring 11 as it is shown in FIG. 10. The fingers protrude outwardly thus supporting the membrane (not shown).

Ring 11 can be made to fit snugly over the tip of the probe. If such a tip and the probe are fabricated as an air-tight assembly, during the installation of the probe cover, a small amount of air is captured between window 20 (as in FIG. 1) and membrane 8. The captured air has a positive pressure, causing membrane 8 to bulge out as shown in FIG. 3. Thus, the air pressure results in a desirable convex shape of the membrane, aiding in better transmission of infrared energy to the sensor.

In one of the embodiments, ring 11 may have snap 14 (FIG. 4) which may be in the shape of the inner wall profile for the secure engaging with the tip of the probe (not shown). The probe tip should have a complementary profile to retain the ring after installation. The installation process includes applying pressure to the ring until it snaps on the probe to position membrane 8 in optical alignment with the probe. After temperature measurement, the ring may be pulled off of the probe tip and discarded. Enveloping film 9 is attached to the ring by ultrasonic or thermal welding, clamping, or alternatively, the ring may be molded with insertion of the film.

The Skirt

Figure 4:
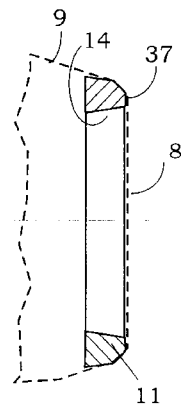
FIG. 4 is a cross-sectional view of a ring.
Figure 5:
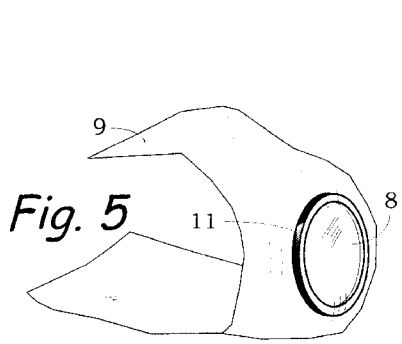
FIG. 5 depicts a probe cover sheet with attached ring.
Figure 12:
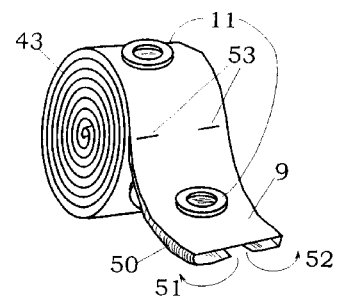
FIG. 12 is a coiled tape of folded probe covers.

The skirt is for enveloping the probe and preventing its contact with the patient's body. In this invention, the skirt is fabricated of a pliant material which adapts to the shape of the probe by conforming to its profile during the installation. In other words, in contrast to membrane 8, the skirt does not have a well defined shape of its own. If needed, the skirt may be stretched, pleated, bent, etc. In a simplest embodiment, the skirt may be fabricated as a piece of thin plastic film 9 (FIGS. 4 and 5) with ring 11 attached to it. When installed, film 9 wraps around the probe while ring 11 is engaged with the probe tip for the correct alignment of membrane 8 perpendicular to the optical axis of the probe. Film 9 is extended over ring 11 thus forming membrane 8. FIG. 4 shows that film 9 may be welded, glued on, clamped or otherwise adhered to ring 11 at area 37 to assure a defined positioning of the membrane. Alternatively, the film and the ring may be fabricated as a unitary item, by, for instance, a casting process. This simple probe cover may be fabricated in form of a continuous tape consisting of any number of sections, wherein each one forms a separate probe cover. To illustrate such a concept, FIG. 12 shows a coiled tape of film 43 with rings 11 attached along a central line. To reduce width of the coil, film 9 may be folded along area 50 and then rolled into a coil. Between rings 11, the film may have partial slits 53 to aid in separation of the section into the individual probe covers. Before installation, each section is separated and unfolded in the direction of arrows 51 and 52, thus forming a probe cover which is illustrated in FIG. 5. Each coiled tape 43 represents a probe cover cartridge which can be loaded into a special dispenser, whose design is outside the scope of this specification.

Figure 6:
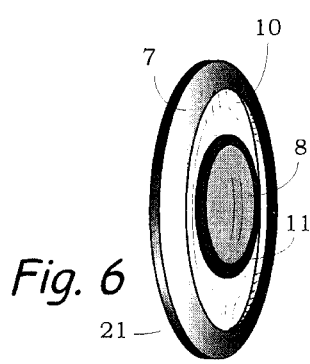
FIG. 6 shows a probe cover in collapsed state.

Another embodiment of the probe cover is where the skirt is positioned between the ring and the additional retention device (the rim) as shown in FIG. 6. The entire probe cover 21 is shown in a collapsed (storage) state. It looks like a nearly flat disk. Many of these disks may be stacked and stored along with the IR thermometer.

Skirt 10 is a thin plastic film positioned between ring 11 and rim 7. Membrane 8 may be a continuation of skirt 10, while being immobilized by ring 11 to retain its optical properties.

Figure 7:
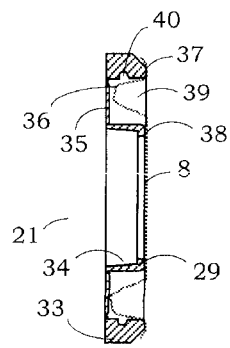
FIG. 7 is a cross-sectional view of a probe cover in a collapsed state.

FIG. 7 shows a cross-section of probe cover 21 where ring 29 and rim 33 are coaxial, while skirt 36 is made of a film positioned in gap 39 between the ring and the rim. The ring-rim combination consists of a prefabricated assembly where these two parts are held together by small joints 35 (there may be several of such joints). A joint is supposed to break off during the installation. A thin film of an infrared transparent polymer is attached to both the ring and the rim at circumferential areas 37 and 38. The attachment may be accomplished by ultrasonic or thermal welding or clamping. In the latter case, both the ring and the rim shall be made of more than one part each.

The portion of the film which covers the opening in ring 29 forms optical membrane 8. The skirt is the portion of the film located in gap 39 between ring 29 and rim 33. The skirt may be flat or it may form one or more folds. Ring 29 may have inner conical profile 34 for better engaging and self-alignment with the IR thermometer or its probe during the installation.

Figure 8:
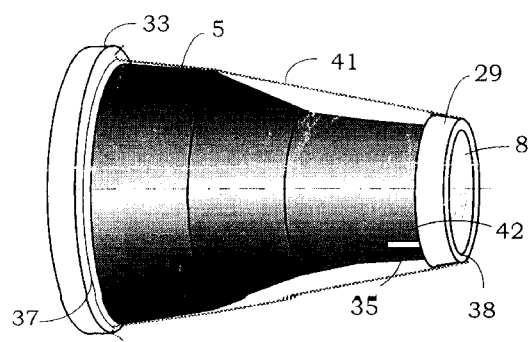
FIG. 8 is a probe cover installed onto the probe.

During the installation, the ring and the rim are separated, while remaining coaxial, and the skirt is expanded. FIG. 8 shows that the probe cover while being installed on probe 5 forms the expanded stretched skirt having the shape of envelope 41. The envelope is shaped of the skirt previously disposed in gap 39 that is shown in FIG. 7. Broken off joints 35 (if any) are positioned inside envelope 41. Ring 29 encases tip 42 of probe 5 in a manner as to position membrane 8 against the probe window. It should be noted that in spite of unfolding and stretching of the skirt which forms envelope 41, membrane 8 remains substantially unchanged, thus preserving its optical properties. This is due to the rigidity of ring 29 and attachment to it of membrane 8 at area 38.

Since the skirt expands during the installation, it must be very stretchable. This may pose some problems, especially if the gap 39 between ring 29 and rim 33 is relatively narrow. In other words, the film of the skirt may not be able to expand far enough to envelop the entire probe, before it breaks. A solution is to make a pleated film which in FIG. 7 is indicated by a fold in skirt 36 positioned inside gap 39. This helps to increase the film area and aid in further film expansion to form envelope 41.

Figure 11:
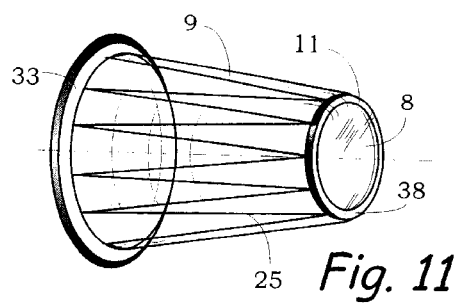
FIG. 11 is a 3-piece probe cover with pleated walls.

A practical embodiment of the probe cover having distinct rim, ring 11 and skirt 9 is shown in FIG. 11. The skirt is fabricated of a pleated film which is securely attached to both the ring and the rim at areas 33 and 38 while forming pre-stretched membrane 8. The pleated film of the skirt is flexible enough to adapt the shape of the probe cover. For better alignment during the installation, some rigidity to the skirt may be given by staking it at some areas of the pleated film. The staking is the thermal or ultrasonic treatment of the pleated film.

The skirt shall be sufficiently strong to preserve its integrity and not to break while the probe cover is being installed onto the probe. Typical thickness of the skirt ranges from 10 to 25 micrometers.

Figures 17A, 17B, 18A, 18B:
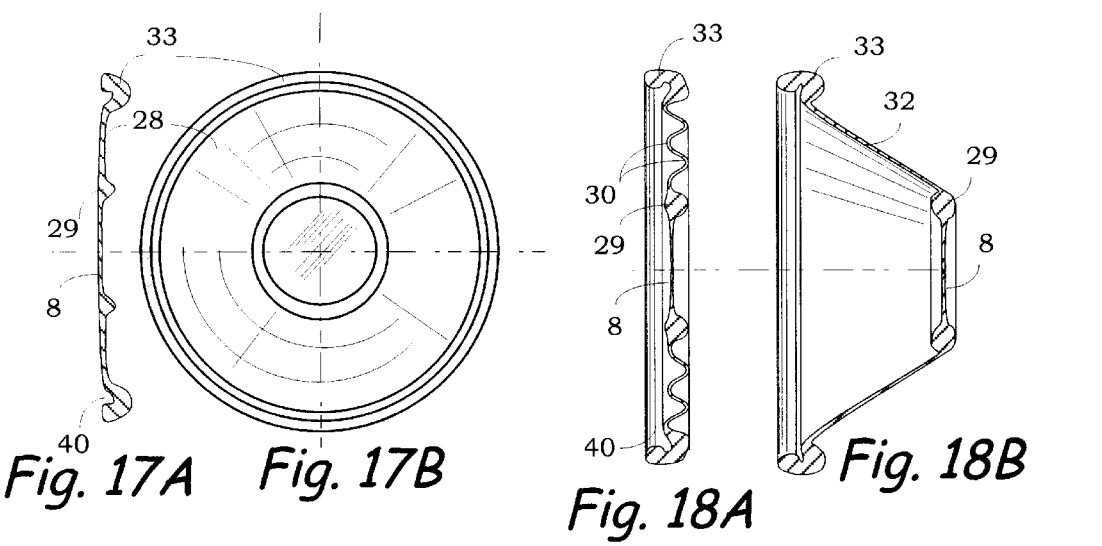
FIGS. 17A and 17B show section and frontal views of a unitary probe cover.
FIGS. 18A and 18B show a unitary probe cover with corrugated film in initial and expanded conditions.

The above described fabricating method assumes usage of a prefabricated ring and rim, or the ring-rim assembly and attachment to it of a separately produced film to form the skirt and the membrane. Another way to form the skirt and the membrane is by using a manufacturing process where the entire probe cover is fabricated as a unitary device (FIGS. 17A, 17B); thus, the skirt is shaped as flat film 28 between rim 33 and ring 29, which are just areas of the increased thickness of the material. Flat film 28 may not have enough stretching capabilities, so an alternative design with pleated skirt is shown in FIGS. 18A, 18B, where pleats 30 may expand during installation to form envelope 32 between ring 29 and rim 33.

The Rim

The rim is for attaching the probe cover to the thermometer and aiding in enveloping the probe by the skirt. In the simplest embodiment of FIG. 5, the rim does not exist, yet its functions may be accomplished by either clamping the ends of film 9 to the body of a thermometer, or by other means known in the art. A more elegant and practical way is shown in FIG. 6 where rim 7 has the shape and engaging components for connecting to a particular IR thermometer and holding the probe cover in place during the temperature measurement procedure. It should be noted that retention rim 7 does not need to have the shape of a circle—it may be oval, rectangular or have any other shape which is best suited for a particular probe design. Also, it may be comprised of several components, which are suitable for better fabrication and interface with the probe. Such components may include laminated layers of plastic and paper, clamping inserts, etc. FIG. 7 shows rigid rim 33 having groove 40 for engaging with the probe. The similar groove 40 is seen in FIGS. 17A and 18.

Figure 13:
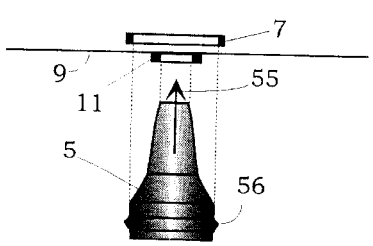
FIG. 13 is a 3-piece probe cover with un-attached rim.
Figure 14:
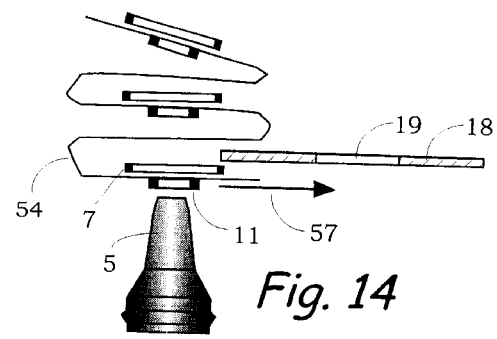
FIG. 14 is a z-folded tape with probe covers.

Generally, it is not necessary to have the rim attached to the skirt or the ring. It may be a separate item and will engage with the rest of the components only during the installation onto the probe. As an illustration, FIG. 13 shows film 9 with permanently attached ring 11. Rim 7 is positioned behind the film, but not attached to it. When probe 5 moves in direction 55, it engages with ring 11 and keeps going through the hole in rim 7, dragging with it film 9. The film folds while being pushed through the hole in rim 7 until the rim is engaged with snap 56 which is part of probe 5. The snap retains the ring along with film 9 which now envelopes the body of probe 5. These probe covers may be fabricated on continuous tape 58 which can be pleated with z-folds as shown in FIG. 14. The tape contains any number of the ring-rim pairs positioned at the opposite sides of the tape. Special separation plate 18 is used to assist in engaging of rim 7 with the probe. During the installation, probe 5 engages with ring 11 and moves in direction 57, thus unfolding the z-fold and aligning ring 11 and rim 7 with opening 19, just as shown in FIG. 13, until rim 7 is fully engaged. After that, the probe is removed from opening 19 and the probe cover may be separated from the tape.

Figure 15:
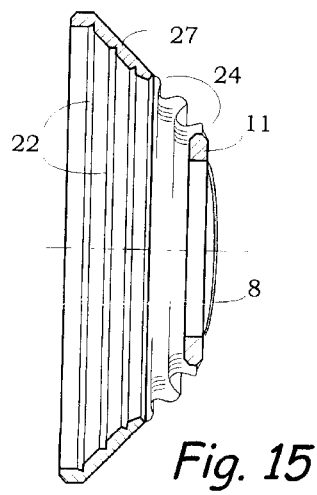
FIG. 15 is a probe cover with a conical rim.
Figure 16:
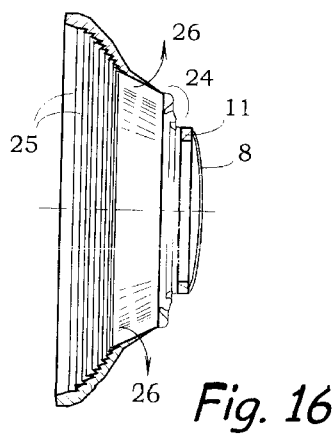
FIG. 16 shows a probe cover with a flexible rim.
Figures 21, 22:
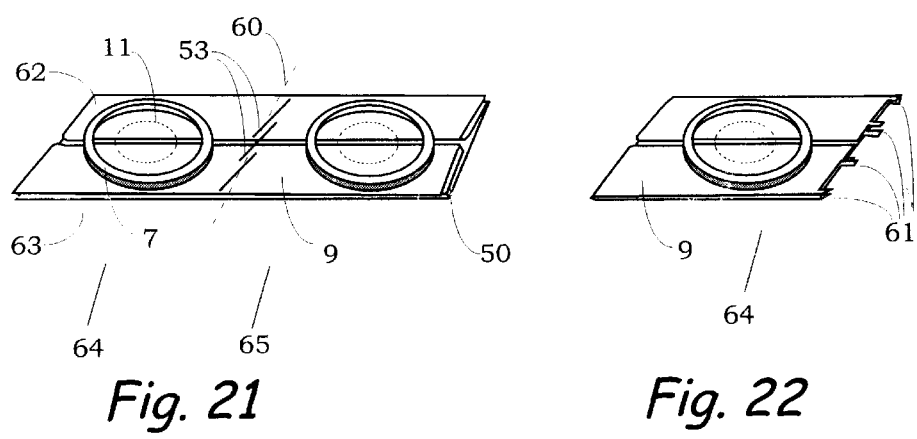
FIG. 21 shows a tape of folded film with attached rim and ring.
FIG. 22 is a separated section of the probe cover tape.

FIG. 21 further illustrates a concept of producing the probe covers on a tape in a continuous process. Just as in FIG. 13, film 9 of FIG. 21 supports rim 7 on one side 62 and ring 11 (shown by dotted line) on the other side 63. Film 9 is pleated along folding area 50. During the installation, the pleated film will unfold through rim 7, but before that, section 64 of the continuous tape will be severed from the adjoined section 65. To ease separation, the area between sections 64 and 65 is perforated with diagonal slits 53. The slits are overlapping and positioned at an angle to desired separation line 60. The best and easy separation occurs when the total number of slits is no more than 5 and the angle is between 3 and 15 degrees. FIG. 22 shows separated section 64. Film 9 is torn between the perforations thus forming leftover tips 61 which do not affect use of the probe covers. In the alternative design of a probe cover, the rim may not be flat but rather have conical profile 27 for better engagement with the IR probe (FIG. 15). Here, the skirt forms pleats 24 for the extended elongation when installed. To better retain conical rim 27 on the probe of the IR thermometer, it may be provided with one or several grooves 22. Alternatively, the rim may be flexible as shown in FIG. 16 for the more intimate engagement with the IR thermometer probe. When installed, the rim flexes in direction 26 for conforming with the probe shape. Sharp creases 25 allow for better grip of the probe and a more reliable retention of the probe cover. Pleats 24 will expand to accommodate the probe shape.

Figures 19, 20A, 20B:
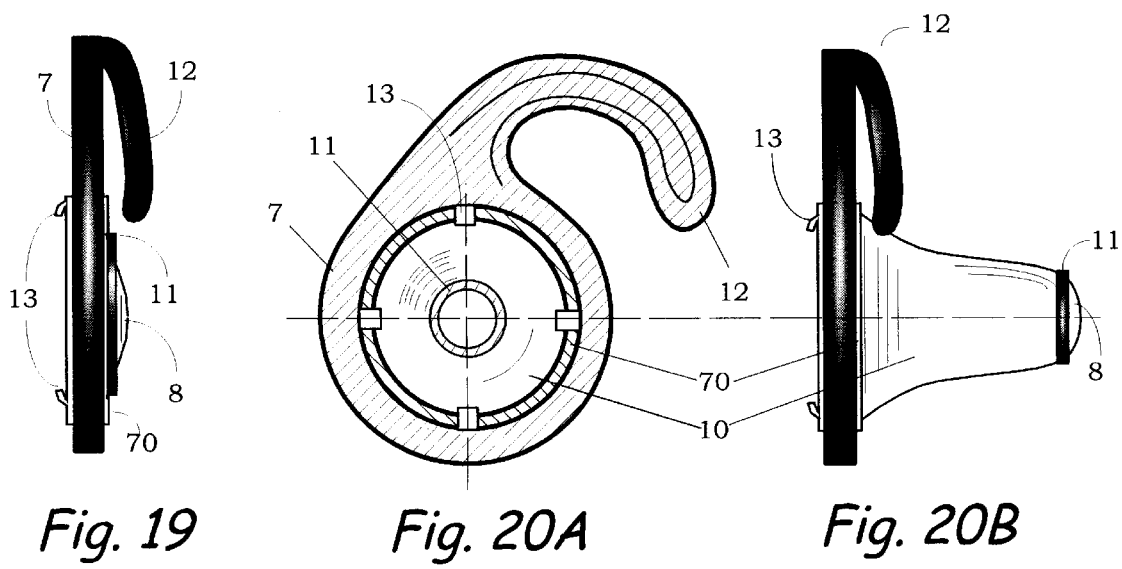
FIG. 19 shows a probe cover with a clip in a storage state.
FIGS. 20A and 20B show the front and side views of a cover with a clip in expanded state.

The rim may be used also to support the IR probe on the patient's ear. FIG. 19 shows a near-flat probe cover in a storage state (not installed) where rim 7 has an extension clip 12 for gripping the patient's ear helix. Rim 7 has hooks 13 for engaging with the IR thermometer or its probe. The purpose of these hooks is identical to that of groove 40 shown in FIG. 7. FIGS. 20A and 20B show the same probe cover with the expanded skirt 10 and convex membrane 8. It is seen that clip 12 has a shape suitable for circumventing the outer ear while holding the cover with the attached probe inside the ear canal. The skirt and the ring may be attached to rim 7 by an auxiliary insert 70. The insert is an intermediate support for the skirt and may be needed for convenience of use when rim 7 is fabricated or packaged separately from the skirt-ring assembly. Clip 12 may have many different shapes and sizes. Also, it may have some additional attachments for better retention on the patient or its clothing. Such attachments are beyond the scope of this invention and not further described here.

Although preferred embodiments of the invention have been disclosed herein in detail, it is to be understood that this is for the purpose of illustrating the invention, and should not be construed as necessarily limiting the scope of the invention since it is apparent that many changes can be made by those skilled in the art while still practicing the invention claimed herein.

What is claimed is:

1. For use with an infrared thermometer probe having a tip to be placed adjacent a body and comprising a window to receive radiation for measuring the temperature of the body;

a probe cover for preventing contact between the body and the probe while allowing radiation to be transmitted through said window to a sensor forming part of said thermometer, said probe cover comprising:
- a distal optical portion including a rigid ring attached at said probe tip on the perimeter of said window and having secured thereto a membrane of fixed shape allowing transmission of radiation from said body through said membrane to said probe without contact between said membrane and said probe, the shape of said membrane not being changed during installation of said cover on said probe; and
- pliant material extending from said distal optical portion to envelop adjacent parts of said probe when said cover is in place on said probe.

2. Apparatus as in claim 1, wherein said rigid ring has a shape corresponding to the shape of said probe tip to provide for coaxial alignment with said probe.

3. Apparatus as in claim 1, wherein said ring is circular.

4. Apparatus as in claim 1, wherein said membrane has a convex profile.

5. Apparatus as in claim 4, wherein said ring has a plurality of fingers protruding outwardly to support said convex membrane.

6. Apparatus as in claim 1, wherein said membrane is formed with a plurality of non-planar protuberances for stiffening reinforcement.

7. Apparatus as in claim 1, wherein said pliant material forms a skirt to surround said adjacent parts of said probe.

8. Apparatus as in claim 1, wherein said probe cover includes a proximal portion for attaching said pliant material to said probe.

9. Apparatus as in claim 8, wherein said proximal portion comprises a rigid rim engageable with said probe to retain said probe cover in place.

10. Apparatus as in claim 9, wherein said rim and said ring are, before placement on said probe, at least approximately coplanar with said pliant material extending therebetween, said material being stretchable to accommodate said rim and said ring being longitudinally displaced in their final positioning on said probe.

11. Apparatus as in claim 10, wherein said rim and said ring are held together by joints arranged to break apart when said rim and ring are displaced longitudinally.

12. Apparatus as in claim 9, wherein said rim has a conical profile.

13. Apparatus as in claim 9, wherein said rim is arranged to allow flexing movement to improve grip of the probe.

14. Apparatus as in claim 1, wherein said pliant material is pleated.

15. Apparatus as in claim 1, wherein said ring is carried by an elongate tape of film, formed of said pliant material, said tape carrying a number of additional rings spaced apart longitudinally along said tape for successive installation on said probe.

16. Apparatus as in claim 5, wherein said pliant material is folded.

17. Apparatus as in claim 16, wherein said pliant material is folded along longitudinal fold lines to reduce the tape width.

18. Apparatus as in claim 15, wherein the tape is formed with partial slits to aid in separation into sections carrying respective rings.

19. Apparatus as in claim 15, wherein said tape is formed in a series of Z-folds;
- a plurality of rigid rims associated with said tape, each in alignment with one of said rings to accommodate installation of both a ring and a rim on a probe.

20. Apparatus as in claim 15, including a plurality of rims associated with said tape, each in alignment with one of said rings and on a side of said tape opposite to the side on which the corresponding ring is located.

21. Apparatus as in claim 1, including means to develop pressure on said membrane to produce bulging thereof into convex shape, aiding in transmission of infrared energy to the sensor.

22. Apparatus as in claim 21, wherein said means to develop pressure comprises means to capture air between said membrane and a window at the tip of said probe.

23. Apparatus as in claim 22, wherein said means is effective to capture said air during installation of said probe cover.

24. Apparatus as in claim 21, wherein said probe and tip are formed as an air-tight assembly.

25. For use with an infrared thermometer probe having a tip to be placed adjacent a body and comprising a window to receive thermal radiation for measuring the temperature of the body; a probe cover for preventing contact between the body and the probe while allowing radiation to be transmitted through said window to a sensor forming part of said thermometer, and for attachment of said cover to the body, said probe cover comprising;
- a distal optical portion for transmitting thermal radiation, said distal optical portion not being changed during installation of said probe cover on said probe;
- an enveloping portion for covering said probe; and
- a proximal portion adopted for attachment of said enveloping portion to the patient's body.

26. Apparatus as in claim 25, wherein said proximal portion is an extension clip for gripping a patient's ear helix.

27. Apparatus as in claim 26, wherein said proximal portion includes an auxiliary insert providing intermediate support for said enveloping portion.

28. The method of providing a cover on the probe of an infrared thermometer having a probe tip comprising a window to receive radiation for measuring the temperature of a body, said method comprising the steps of (but not necessarily in the order given):
- supporting a membrane under tension by a rigid ring to form a distal optical cover portion providing transmissibility of infrared radiation through the membrane, the shape of said membrane not being changed during installation of said cover on said probe;
- positioning said membrane in front of said window to allow infrared radiation to pass into said probe; and
- providing a skirt of pliant material extending from the region of said membrane to form an envelope surrounding adjacent parts of said probe.

29. The method of claim 28, including the step of securing said membrane to a rigid ring.

30. The method of claim 28, including the step of forming said membrane with a convex shape.

31. The method of claim 28, wherein said cover comprises a proximal portion to which said pliant material skirt extends from the region of said membrane; and
- securing said proximal cover portion to said probe.

32. The method of claim 31, including the step of securing said proximal cover portion to said probe by a rim effecting attachment of said pliant material to the probe.

33. The method of claim 32, including the step of initially providing said ring and said rim together in a close configuration with said pliant material extending therebetween; and
- displacing said ring and said rim longitudinally apart while stretching said pliant material during placement of said cover on said probe.

34. The method of claim 33, wherein said rim and said ring are initially at least approximately coplanar;

said pliant material being initially in folded condition in a space between said ring and said rim and being unfolded as said ring and said rim are displaced longitudinally apart during positioning of said cover on said probe.

35. The method of claim 28, wherein said pliant material is initially provided in folded condition; and unfolding said pliant material while placing it around said adjacent parts of said probe.

36. The method of claim 28, including the step of applying pressure to said membrane to effect convex shaping thereof to improve transmissibility of infrared energy through said membrane.

37. The method of claim 36, wherein said pressure is developed during installation of said cover on said probe.

38. The method of claim 37, wherein said pressure is developed by capturing air between said membrane and the tip of the probe.

39. For use with an infrared thermometer probe having a tip to be placed adjacent a body and comprising a window to receive radiation for measuring the temperature of the body; a probe cover for preventing contact between the body and the probe while allowing radiation to be transmitted through said window to a sensor forming part of said thermometer, said probe cover comprising a membrane adjacent said probe window and allowing transmission of radiation from said body through said membrane to said probe, the shape of said membrane not being changed during installation of said probe cover on said probe;

that improvement comprising a rigid ring securing said membrane and means to develop pressure on said membrane to form it into a convex shape to improve the transmissibility of infrared energy through said membrane.

40. Apparatus as in claim 39, including means to develop said pressure by air captured in an enclosed region adjacent said membrane.

41. Apparatus as in claim 40, wherein said means to develop said pressure comprises a probe and a probe tip fabricated as an air-tight assembly.

42. The method of providing a cover on the probe of an infrared thermometer having a probe tip comprising a window to receive radiation for measuring the temperature of a body, said method comprising the steps of (but not necessarily in the order given):

supporting a membrane with a rigid ring in front of said probe window providing transmissibility of infrared radiation through the membrane to a sensor in the thermometer, the shape of said membrane not being changed during installation of said cover on said probe; and applying pressure to said membrane to form it into convex shape to effect improved transmissibility of infrared radiation through said membrane.

43. The method of claim 42, wherein said pressure is developed during installation of said cover on said probe.

44. The method of claim 42, wherein said pressure is developed by air captured between said membrane and said probe tip.

45. An elongate tape of film formed of pliant material; and a plurality of rigid rings, each rigid ring having secured thereto a membrane of fixed shape, the rigid rings spaced apart longitudinally along said tape for successive installation on infrared thermometer probes, wherein the shape of said membrane is not changed during installation on said probes.

46. Apparatus as in claim 45, wherein said pliant material is folded along a longitudinal line.

47. Apparatus as in claim 45, wherein said pliant material is folded inwardly along two longitudinal fold lines.

48. Apparatus as in claim 45 wherein said tape is formed with partial slits to aid in separation into sections carrying respective rings.

49. Apparatus as in claim 45, wherein said tape is formed in a series of Z-folds;

a plurality of rigid rims associated with said tape, each in alignment with one of said rings to accommodate installation of both a ring and a rim on a thermometer probe.

50. Apparatus as in claim 45, including a plurality of rims associated with said tape, each in alignment with one of said rings and on a side of said tape opposite to the side on which the corresponding ring is located.

51. For use with an infrared thermometer probe having a tip to be placed adjacent a body and comprising a window to receive thermal radiation for measuring the temperature of the body; a probe cover for preventing contact between the body and the probe while allowing radiation to be transmitted through said window to a sensor forming part of said thermometer, and for attachment of said cover to the body, said probe cover comprising;

a distal optical portion for transmitting thermal radiation, the shape of said distal optical portion not being changed during installation of said cover on said probe;

an enveloping portion for covering said probe; and an extension clip adopted for attachment of said enveloping portion to a patient's ear helix.

* * * * *